United States Patent
Miwa

(10) Patent No.: US 9,390,850 B2
(45) Date of Patent: Jul. 12, 2016

(54) POWER TRANSMITTING DEVICE, POWER FEEDING SYSTEM, AND POWER FEEDING METHOD

(71) Applicant: SEMICONDUCTOR ENERGY LABORATORY CO., LTD., Atsugi-shi, Kanagawa-ken (JP)

(72) Inventor: Misako Miwa, Miyagi (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 568 days.

(21) Appl. No.: 13/934,290

(22) Filed: Jul. 3, 2013

(65) Prior Publication Data

US 2014/0015332 A1    Jan. 16, 2014

(30) Foreign Application Priority Data

Jul. 13, 2012    (JP) .................................. 2012-157074

(51) Int. Cl.
| | |
|---|---|
| H01F 27/42 | (2006.01) |
| H01F 37/00 | (2006.01) |
| H01F 38/00 | (2006.01) |
| H01F 38/14 | (2006.01) |
| H02J 17/00 | (2006.01) |
| H02J 5/00 | (2016.01) |

(52) U.S. Cl.
CPC ................ H01F 38/14 (2013.01); H02J 5/005 (2013.01); H02J 17/00 (2013.01)

(58) Field of Classification Search
CPC .......... H02J 17/00; H02J 7/025; H02J 5/005; H01F 38/14; H03H 7/38; B60L 11/182
USPC ................ 307/149, 9.1, 10.1, 64; 333/32, 33; 455/226.1, 226.2; 324/637; 343/750, 343/715
See application file for complete search history.

(56) References Cited

U.S. PATENT DOCUMENTS

| | | | |
|---|---|---|---|
| 5,124,699 A | 6/1992 | Tervoert et al. | |
| 5,428,521 A | 6/1995 | Kigawa et al. | |
| 5,471,146 A * | 11/1995 | Krayeski .............. | H04B 17/318 324/637 |
| 5,790,946 A | 8/1998 | Rotzoll | |
| 6,509,217 B1 | 1/2003 | Reddy | |
| 6,737,302 B2 | 5/2004 | Arao | |
| 6,745,046 B1 * | 6/2004 | Eckert .................... | H04B 1/406 343/702 |

(Continued)

FOREIGN PATENT DOCUMENTS

| | | |
|---|---|---|
| JP | 2010-119246 | 5/2010 |
| WO | WO 2010-055381 A1 | 5/2010 |

Primary Examiner — Rexford Barnie
Assistant Examiner — Jagdeep Dhillon
(74) Attorney, Agent, or Firm — Nixon Peabody LLP; Jeffrey L. Costellia

(57) ABSTRACT

Provided is a power transmitting device, a power feeding system, and a power feeding method in which power loss is cut by increasing power use efficiency and power can be supplied to a power feeding user (a power receiving device) with high power transmission efficiency. Depending on a power feeding state (e.g., resonant frequency of a power transmitting resonance coil is not the same as that of a power receiving resonance coil, or the influence of their positional relation), power transmitted from a power source portion of the power transmitting device is reflected to the power transmitting coil side by the power transmitting resonance coil. Further, a power recovering function (circulation function) for power reflected to the power transmitting device is provided to recover the power reflected to the power transmitting coil side and to reuse it for power transmission.

20 Claims, 8 Drawing Sheets

(56) References Cited

U.S. PATENT DOCUMENTS

| | | |
|---|---|---|
| 6,837,438 B1 | 1/2005 | Takasugi et al. |
| 7,180,421 B2 | 2/2007 | Pahlaven et al. |
| 7,209,771 B2 | 4/2007 | Twitchell, Jr. |
| 7,301,830 B2 | 11/2007 | Takahashi et al. |
| 7,394,382 B2 | 7/2008 | Nitzan et al. |
| 2002/0049714 A1 | 4/2002 | Yamazaki et al. |
| 2003/0017804 A1 | 1/2003 | Heinrich et al. |
| 2003/0104848 A1 | 6/2003 | Brideglall |
| 2004/0077383 A1 | 4/2004 | Lappetelainen et al. |
| 2004/0128246 A1 | 7/2004 | Takayama et al. |
| 2004/0131897 A1 | 7/2004 | Jenson et al. |
| 2004/0145454 A1 | 7/2004 | Powell et al. |
| 2005/0020321 A1 | 1/2005 | Rotzoll |
| 2005/0215119 A1 | 9/2005 | Kaneko |
| 2005/0254183 A1 | 11/2005 | Ishida et al. |
| 2006/0009251 A1 | 1/2006 | Noda et al. |
| 2007/0216348 A1 | 9/2007 | Shionoiri et al. |
| 2007/0229228 A1 | 10/2007 | Yamazaki et al. |
| 2007/0229271 A1 | 10/2007 | Shionoiri et al. |
| 2007/0229279 A1 | 10/2007 | Yamazaki et al. |
| 2007/0229281 A1 | 10/2007 | Shionoiri et al. |
| 2007/0278998 A1 | 12/2007 | Koyama |
| 2007/0285246 A1 | 12/2007 | Koyama |
| 2010/0208499 A1* | 8/2010 | Halberstadt ......... H02M 3/3376 363/21.1 |
| 2010/0244978 A1* | 9/2010 | Milosavljevic ...... H04B 1/0458 333/33 |
| 2010/0289449 A1 | 11/2010 | Elo |
| 2011/0080053 A1 | 4/2011 | Urano |
| 2011/0095619 A1 | 4/2011 | Urano |
| 2011/0101791 A1 | 5/2011 | Urano |
| 2011/0270462 A1 | 11/2011 | Amano et al. |
| 2012/0025611 A1 | 2/2012 | Kamata et al. |
| 2012/0025627 A1 | 2/2012 | Shionoiri et al. |
| 2012/0062039 A1 | 3/2012 | Kamata et al. |
| 2012/0091950 A1* | 4/2012 | Campanella ............ H02J 5/005 320/108 |
| 2012/0153739 A1* | 6/2012 | Cooper .................. H02J 7/025 307/104 |

\* cited by examiner

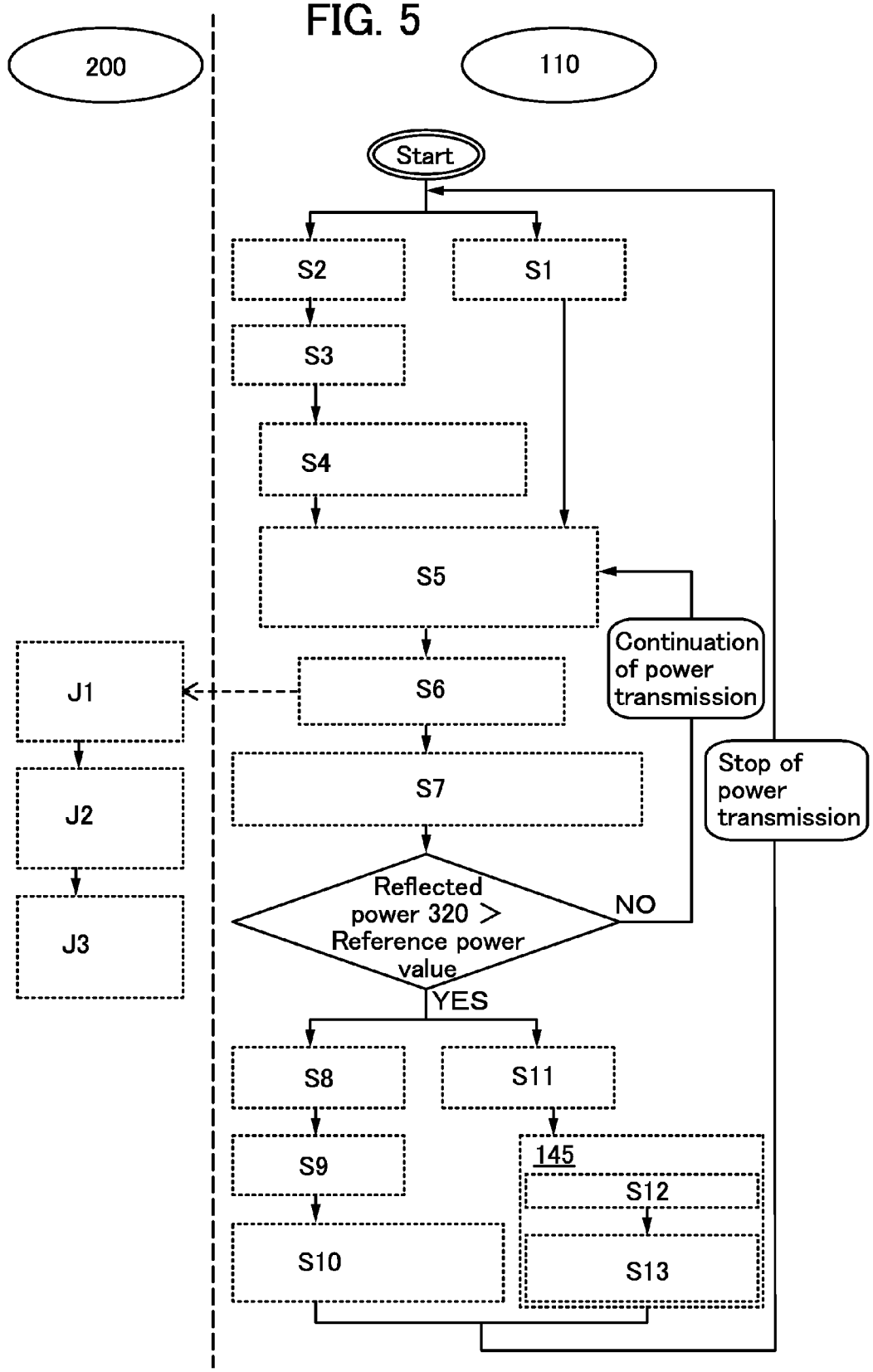

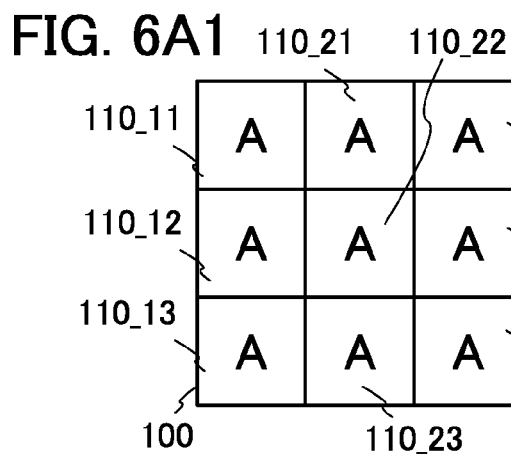
FIG. 6A1
FIG. 6A2
| | 121 | 116 | 131 |
|---|---|---|---|
| 110_11 ~110_33 | On | On | Off |
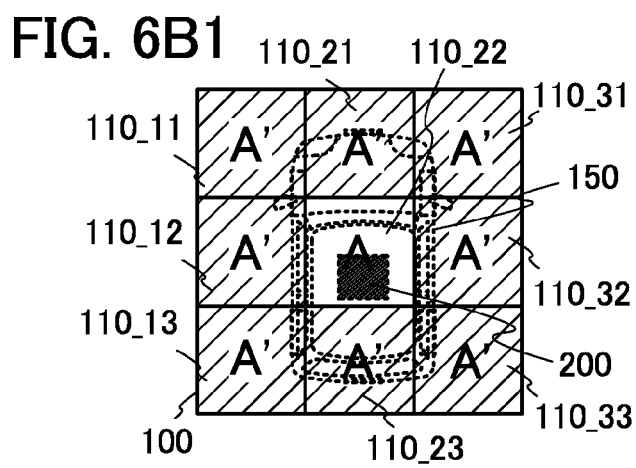
FIG. 6B1
FIG. 6B2
| | 121 | 116 | 131 |
|---|---|---|---|
| 110_22 | On | On | Off |
| 110_11 ~110_21 110_23 ~110_33 | Off | Off | On |
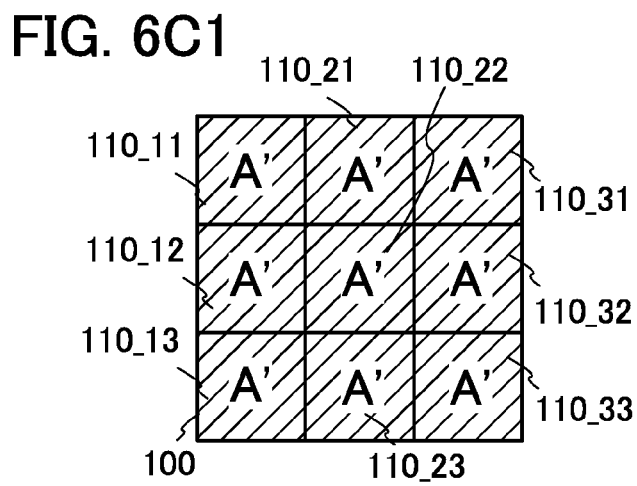
FIG. 6C1
FIG. 6C2
| | 121 | 116 | 131 |
|---|---|---|---|
| 110_11 ~110_33 | Off | Off | On |

US 9,390,850 B2

POWER TRANSMITTING DEVICE, POWER FEEDING SYSTEM, AND POWER FEEDING METHOD

BACKGROUND OF THE INVENTION

1. Field of the Invention

The present invention relates to a power transmitting device, a power feeding system, and a power feeding method.

2. Description of the Related Art

In recent years, electronic devices using power as a prime mover, as typified by mobile devices such as mobile phones or notebook personal computers, are often used while being carried. Also, transportation means such as bicycles and automobiles using electric power as a prime mover have been developed from the point of view of environmental cleanness and safety.

Since such portable electronic devices and such transportation means are often used outdoors, it is difficult to constantly supply power from a commercial power supply distributed to each house, through wires. Therefore, the portable electronic devices and the transportation means are provided with batteries which are charged from a commercial power supply in advance and operate by power supply from the batteries.

However, since the amount of power stored in the batteries is finite, users need to recharge the batteries outdoors in order to continue to use the portable electronic devices or the transportation means in the case where power stored in the batteries is exhausted when they are in use outdoors. Accordingly, power feeding service which can be used outdoors has been required in addition to conventional power feeding service with which power is distributed to an indoor commercial power supply.

A power feeding method and a power feeding system having high versatility with which an unspecified number of users can use them and having high supply efficiency with which the amount of supplied power and the speed of power supply become high, which are different from the conventional power feeding service used indoors by certain individuals, are needed for power feeding service given outdoors.

Therefore, a wireless power feeding method in which power feeding is performed wirelessly has been researched in addition to a conventional wired power feeding method using a wire. As the wireless power feeding method, for example, an electromagnetic coupling method (also referred to as an electromagnetic induction method), an electric wave method (also referred to as a microwave method), and a resonance method (also referred to as a resonant method) have been proposed, and there is a report for a further improvement in efficiency of power transmission (power transmission efficiency) (e.g., see Patent Document 1).

REFERENCE

[Patent Document]
[Patent Document 1] Japanese Published Patent Application No. 2010-119246

SUMMARY OF THE INVENTION

However, since power is transmitted using electromagnetic waves in a wireless power feeding system, the power transmission efficiency is likely to be lowered although power can be fed wirelessly.

An object of one embodiment of the present invention is to provide a power transmitting device, a power feeding system, and a power feeding method in which power loss is cut by increasing power use efficiency and power can be supplied to a power feeding user (a power receiving device) with high power transmission efficiency.

Another object of one embodiment of the present invention is to provide a power feeding system and a power feeding method in which a power feeding provider (a power transmitting device) can have a high power supply ability to offer power feeding service to more power feeding users (power receiving devices) in a shorter time.

Another object of one embodiment of the present invention is to provide a power feeding system and a power feeding method which can offer a power feeding service which is efficient to both a power feeding user and a power feeding provider.

A power transmitting device, a power feeding system, and a power feeding method which are disclosed in this specification are wireless power feeding systems and a wireless power feeding method, which use a resonance method (a resonant method) using a power transmitting device which detects the power feeding state and includes a plurality of adjacently provided power transmitting portions each of which independently controls the start, the continuation, and the stop of power transmission to a power receiving device. Power feeding from the power transmitting device to the power receiving device is performed using a magnetic resonance phenomenon between resonance coils which are included in the power transmitting portion and a power receiving portion and have the same resonant frequency.

The power transmitting device, a power feeding system, and a power feeding method disclosed in this specification are configured to perform power feeding in the case where a first condition and a second condition are satisfied.

Under the first condition, a power transmitting resonance coil is resonant with a power receiving resonance coil. When the power transmitting resonance coil and the power receiving resonance coil have the same resonant frequency, they can be resonant with each other.

Further, power transmission efficiency is increased when the distance between the power transmitting resonance coil and the power receiving resonance coil is small, whereas it is decreased when the distance therebetween is large. Thus, under the second condition, power is transmitted by a power transmitting portion, among a plurality of power transmitting portions provided in the power transmitting device, which includes a power transmitting resonance coil most close to the power receiving resonance coil.

In the power transmitting device, the power feeding system, and the power feeding method disclosed in this specification, all the power transmitting resonance coils are resonant with the power receiving resonance coil to start power transmission, a power transmitting portion including a power transmitting resonance coil most close to the power receiving resonance coil is selected from a plurality of power transmitting portions provided in the power transmitting device depending on the power transmitting state in the power transmitting portions, power transmission is kept in the selected power transmitting portion, and the power transmitting resonance coil is not resonant with the power receiving resonance coil to stop power transmission in the other power transmitting portions which are not selected.

The power transmitting resonance coil is not resonant with the power receiving resonance coil (i.e., in the non-resonance state) depending on a power feeding state (e.g., resonant frequency of the power transmitting resonance coil is not the same as that of the power receiving resonance coil, or the distance between the power transmitting resonance coil and the power receiving resonance coil is large). Power transmitted from the power source portion of the power transmitting device is reflected to the power transmitting device side by the power transmitting resonance coil. Such power reflected to the power transmitting device side is also referred to as reflected power in this specification.

According to the power transmitting device, the power feeding system, and the power feeding method disclosed in this specification, whether power transmission from the power transmitting portion to the power receiving device is kept or stopped is determined depending on the value of the reflected power (the voltage value of reflected power) on the basis of a pre-determined power value (the reference power). Power transmission is kept when the reflected power is smaller than the reference power, whereas power transmission is stopped when the reflected power is larger than the reference power.

In addition, according to the power transmitting device, the power feeding system, and the power feeding method disclosed in this specification, the power transmitting device is characterized in that power reflected to the power transmitting coil side is recovered to reuse for power transmission. The recovered power can be stored in a power storage means such as a secondary battery provided in the power transmitting device.

The storage means may be provided in each of the power transmitting devices, in the plurality of power transmitting portions, or in each of the power transmitting portions. Alternatively, reflected power that is directly recovered may be transmitted to the power source portion without via the storage means or the like.

In particular, the above-described power feeding system includes a determination period (including a monitoring period and a selecting period) for determining whether the first condition and the second condition are satisfied or not. In this determination period, the reflected power which is not transmitted to the power receiving device and reflected into the power transmitting device side is increased because power transmission efficiency is not optimized. For this reason, it is advantageous that the reflected power is recovered in the power transmitting device to be reused for power transmission, as in the power feeding system and the power feeding method disclosed in this specification. Since the power transmitting device has the power-circulating function, power use efficiency can be improved.

One embodiment of the present invention disclosed in this specification is a power transmitting device including a plurality of adjacent power transmitting portions and a power source portion electrically connected to the power transmitting portions. The plurality of adjacent power transmitting portions each include a power transmitting coil configured to be supplied with power from the power source portion and including a first switch; a power transmitting resonance coil which is not in contact with the power transmitting coil and is electromagnetically coupled with the power transmitting coil by electromagnetic induction; and a directional coupler which inputs reflected power reflected from the power transmitting resonance coil to a second switch and a third switch. The second switch is turned on if the inputted reflected power is smaller than the reference power. The third switch is turned on when the inputted reflected power is larger than the reference power. The first switch is turned on when the second switch is turned on. The power transmitting device is in a power transmitting state when the first switch included in the power transmitting resonance coil is turned on. The power transmitting device is in a non-power transmitting state when the first switch included in the power transmitting resonance coil is turned off.

Another embodiment of the present invention disclosed in this specification is a power transmitting device including a power storage means between the third switch and the power source portion in the above-described structure.

Another embodiment of the present invention disclosed in this specification is a power transmitting device in which the first switch and the second switch are p-channel transistors and the third switch is an n-channel transistor in the above-described structure. In the power transmitting device, the directional coupler, a gate and one of a source and a drain of a second transistor, and a gate and one of a source and a drain of a third transistor are electrically connected to one another. The other of the source and the drain of the second transistor is electrically connected to a gate of a first transistor. The other of the source and the drain of the third transistor is electrically connected to the power source portion.

Another embodiment of the present invention disclosed in this specification is a power transmitting device in which the power transmitting portion in the above-described structure includes a capacitor for adjusting the resonant frequency on the power transmitting side which is electrically connected to the power transmitting resonance coil and the first switch.

A power feeding system can be composed of the power transmitting device.

Another embodiment of the present invention disclosed in this specification is a power feeding system including any of the above-described power transmitting device, a power receiving portion, and a power receiving device including a load portion which is electrically connected to the power receiving portion. In the power receiving device, the power receiving portion includes a power receiving coil for supplying power to the loading portion and a power receiving resonance coil which is not in contact with the power transmitting coil and is electromagnetically coupled with the power transmitting coil by electromagnetic induction. The power transmitting resonance coil is resonant with the power receiving resonance coil in a power transmitting state.

Another embodiment of the present invention disclosed in this specification is a power feeding system in the above-described structure in which the power receiving portion includes a capacitor for adjusting the resonant frequency on the power receiving side which is electrically connected to the power receiving resonance coil.

Another embodiment of the present invention disclosed in this specification is a power feeding method using any of the above-described power feeding system and including the following steps: a first step in which, in the plurality of power transmitting portions, the third switch is turned off and the first switch and the second switch are turned on to set the power transmitting device into a power transmitting state; a second step in which, in the power transmitting coil, power supplied from the power source portion is transmitted to the power transmitting resonance coil; a third step in which, in the power transmitting resonance coil, power is transmitted to the power receiving device; and a fourth step in which power reflected by the power transmitting resonance coil in the third step is inputted to the second switch and the third switch via the directional coupler. If the reflected power is smaller than the reference power in the fourth step, the first switch and the second switch remain ON and the power transmitting portion keeps transmitting power to the power receiving device to repeat the third step and the fourth step. If the reflected power is larger than the reference power in the fourth step, the first switch and the second switch are turned off and the power transmitting device is in a non-power transmitting state and also the third switch is turned on to transmit the reflected power to the power source portion via the third switch.

Another embodiment of the present invention disclosed in this specification is a power feeding system in the above-described structure in which resonant frequency of the power transmitting resonance coil is different between in the power transmitting state and the non-power transmitting state.

According to one embodiment of the present invention, a power recovering function (circulation function) is provided for a power transmitting device, so that use efficiency of power for transmission can be improved.

According to one embodiment of the present invention, a power feeding system and a power feeding method using a resonance method in which a power transmitting region (a region from which power can be supplied) is increased and power can be supplied with high power transmission efficiency (high power supply efficiency) can be provided by using a power transmitting device including a plurality of power transmitting portions each including a power transmitting resonance coil.

According to another embodiment of the present invention, a power feeding system and a power feeding method in which a power feeding provider (a power transmitting device) can have a high power supply ability to offer power feeding service to more power feeding users (power receiving devices) in a shorter time can be provided.

According to another embodiment of the present invention, a power feeding system and a power feeding method which can offer a power feeding service which is efficient to both a power feeding user and a power feeding provider can be provided.

BRIEF DESCRIPTION OF THE DRAWINGS

In the accompanying drawings:

FIG. 5 is a view illustrating one embodiment of a power feeding method;

FIGS. 6A1, 6A2, 6B1, 6B2, 6C1, and 6C2 illustrate an example of power feeding using a power feeding system;

DETAILED DESCRIPTION OF THE INVENTION

Figure 1A:
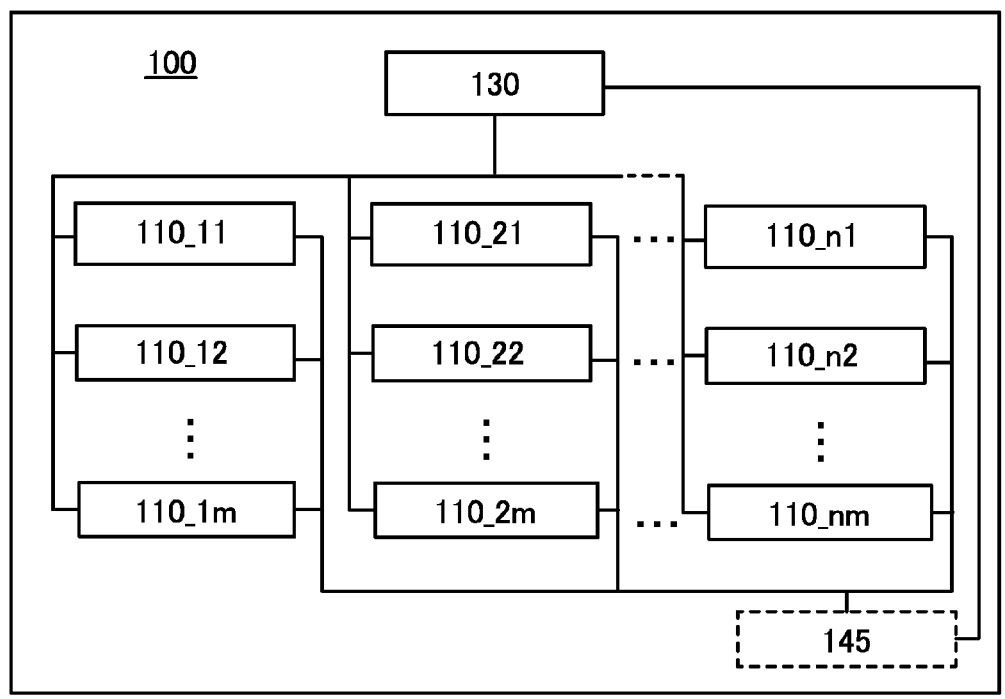
FIGS. 1A to 1C illustrate one embodiment of a power feeding system.

Hereinafter, Embodiments are described in detail using the drawings. Note that the present invention is not limited to the description of the embodiments, and it is apparent to those skilled in the art that modes and details can be modified in various ways without departing from the spirit of the present invention disclosed in this specification and the like. A structure of the different embodiment can be implemented by combination appropriately. On the description of the invention with reference to the drawings, a reference numeral indicating the same part is used in common throughout different drawings, and the repeated description is omitted.

Note that the position, the size, the range, or the like of each structure illustrated in drawings and the like is not accurately represented in some cases for easy understanding. Therefore, the disclosed invention is not necessarily limited to the position, size, range, or the like as disclosed in the drawings and the like.

In this specification and the like, ordinal numbers such as "first", "second", and "third" are used in order to avoid confusion among components, and the terms do not limit the components numerically.

Embodiment 1

In this embodiment, embodiments of a power transmitting device, a power feeding system, and a power feeding method are described with reference to FIGS. 1A to 1C, FIGS. 2A and 2B, FIGS. 3A and 3B, FIG. 4, and FIG. 5.

First, the power feeding system which is one embodiment of the present invention is described below with reference to FIGS. 1A to 1C, FIGS. 2A and 2B, FIGS. 3A and 3B, FIG. 4.

Figure 1B:
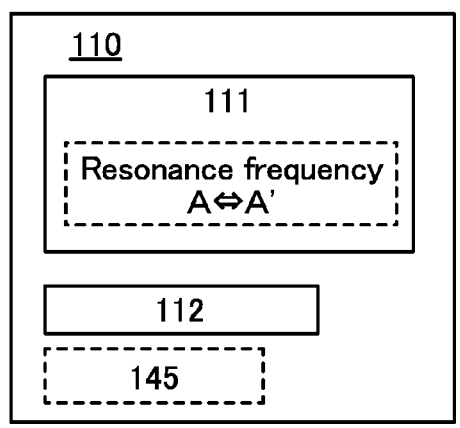
Figure 1C:
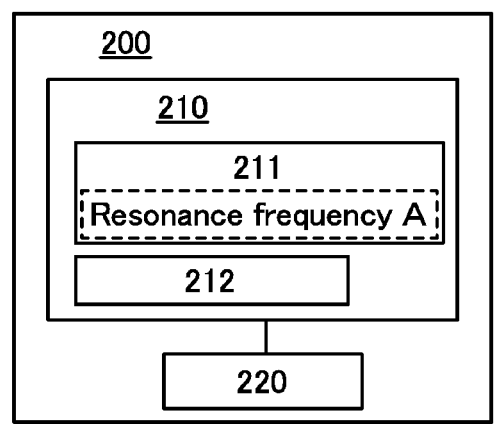

FIGS. 1A and 1B are block diagrams illustrating a structure of a power transmitting device which is included in the power feeding system, and FIG. 1C is a block diagram illustrating a structure of a power receiving device which is included in the power feeding system. Note that a component and a function are not necessarily in a one-to-one relation, and a power feeding system may operate by relating a plurality of components and a plurality of functions to each other.

In the power feeding system in this embodiment, power is supplied from the power transmitting device which is electrically connected to a power source portion to the power receiving device wirelessly. Although there is no particular limitation on a shape or an arrangement of a plurality of power transmitting portions, an example in which the plurality of power transmitting portions are arranged in matrix is described in this embodiment.

A power transmitting device 100 shown in FIG. 1A includes a plurality of power transmitting portions 110 (110_11 to 110_nm) arranged horizontally in n columns (n is a natural number) and vertically in m rows (m is a natural number). The power transmitting portions 110 (110_11 to 110_nm) are each electrically connected to a power source portion 130 provided in the power transmitting device 100. Note that in this specification and the drawings, components having a similar function are distinguished by "_1", "_2", and the like added to the end of their names.

In the power transmitting device 100, there is no particular limitation on a structure of connection between the power transmitting portions 110 (110_11 to 110_nm) and the power source portion 130. As shown in FIGS. 1A to 1C, the power transmitting portions 110 (110_11 to 110_1m), the power transmitting portions 110 (110_21 to 110_2m), and the power transmitting portions 110 (110_n1 to 110_nm), which are electrically connected to each other, may be connected to the power source portion 130. Alternatively, each of the power transmitting portions 110 (110_11 to 110_nm) may be independently connected to the power source portion 130.

FIG. 1B illustrates the power transmitting portion 110 (each of the power transmitting portions 110_11 to 110_nm) in detail. The power transmitting portion 110 includes a power transmitting resonance coil 111 and a power transmitting coil 112. The resonant frequency of the power transmitting resonance coil 111 can be set to Resonant frequency A or Resonant frequency A' by electrically switching Resonant frequency A and Resonant frequency A'.

Note that the power transmitting device 100 has a recovering function (recycling function) of power which is not transmitted. Power recovered from the power transmitting portions 110 (110_n1 to 110_nm) is transmitted to the power source portion 130 and supplied again to the power transmitting portions 110 (110_n1 to 110_nm). In this embodiment, an example in which a storage means 145 for storing power recovered from the power transmitting portions 110 (110_n1 to 110_nm) is provided is described. The storage means 145 may be provided in each of the power transmitting devices 100, in the plurality of power transmitting portions, or in each of the power transmitting portions 110 (110_n1 to 110_nm). In the case where the storage means 145 is provided in each of the power transmitting portions 110, the storage means 145 may be provided inside the power transmitting portions 110 (see FIG. 1B). Alternatively, reflected power that is directly recovered may be transmitted to the power source portion 130 without via the storage means 145 or the like. Further alternatively, power stored in the storage means 145 may be transmitted from the storage means 145 directly to the power transmitting portions 110 (110_n1 to 110_nm) without via the power source portion 130.

For the storage means 145, a secondary battery (e.g., a nickel-cadmium battery, a nickel-hydride battery, or a lithium-ion battery) or the like can be used.

A power receiving device 200 in FIG. 1C includes a power receiving portion 210 including a power receiving resonance coil 211 and a power receiving coil 212, and a load portion 220 which is electrically connected to the power receiving portion 210. The resonant frequency of the power receiving resonance coil 211 is Resonant frequency A. The resonant frequency of the power receiving resonance coil 211 in this embodiment is constant and determined in manufacture depending on the material and the shape of the coil and the circuit configuration of a capacitor or the like.

Specific examples of the power transmitting portion 110 are illustrated in FIGS. 2A and 2B and FIGS. 3A and 3B.

Figure 2A:
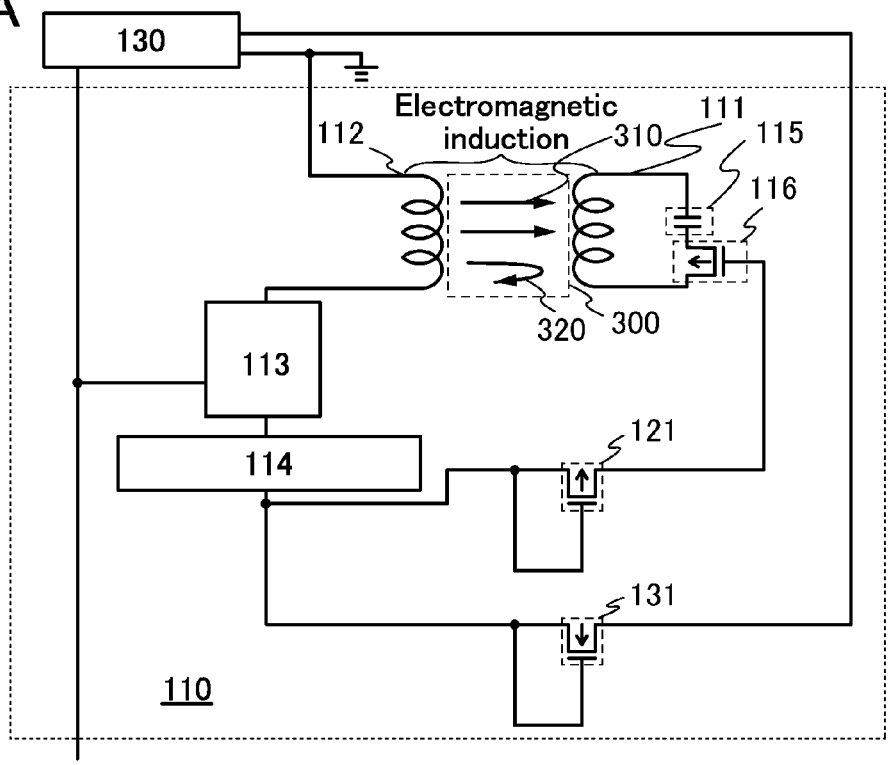
FIGS. 2A and 2B illustrate one embodiment of a power transmitting device.

The power transmitting portion 110 in FIG. 2A includes a power transmitting resonance coil 111 which includes a switch 116 (a first switch) and a capacitor 115 for adjusting the resonant frequency, a power transmitting coil 112, a directional coupler 113, an AC-DC converter 114, a switch 121 (a second switch), and a switch 131 (a third switch). Note that in this embodiment, the switches 116 and 121 are p-channel transistors and the switch 131 is an n-channel transistor.

The AC-DC converter 114 for converting AC to DC is provided between the directional coupler 113 and the switches 121 and 131 because reflected power transmitted from the directional coupler 113 is AC.

Note that FIG. 2A shows an example of the power transmitting portion 110 in which reflected power 320 is directly transmitted to the power source portion 130 without via the storage means 145 and the like.

Figure 2B:
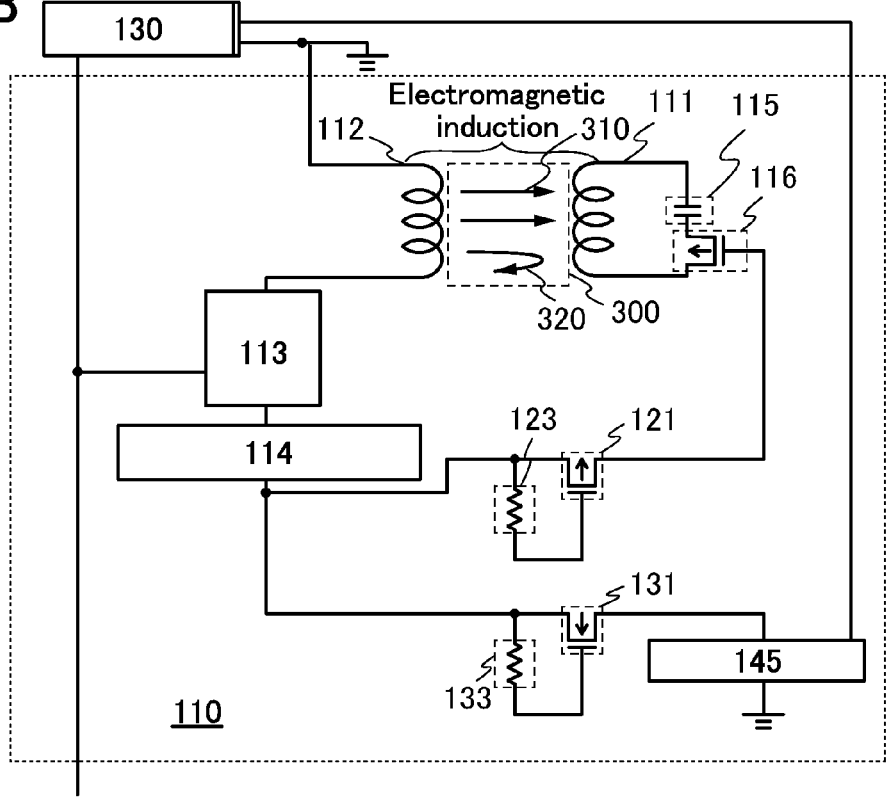

The power transmitting portion 110 in FIG. 2B includes the power transmitting resonance coil 111 which includes the switch 116 and the capacitor 115 for adjusting the resonant frequency, the power transmitting coil 112, the directional coupler 113, the switch 121, the switch 131, the AC-DC converter 114, a resistor 123, and a resistor 133.

As the power transmitting portion 110 in FIG. 2B, the resistor 123 and the resistor 133 may be configured to control current inputted to a gate of the switch 121 and a gate of the switch 131, respectively.

On the other hand, the power transmitting portion 110 in FIG. 2B includes the storage means 145 between the switch 131 and the power source portion 130 as an example and can store the reflected power 320 recovered through the switch 131 in the storage means 145. Although not illustrated, power stored in the storage means 145 may be directly supplied to the power transmitting portion 110. In the example of FIG. 2B, the storage means 145 is electrically connected to the power source portion 130, and the power stored in the storage means 145 can be supplied to the power transmitting portion 110 via the power source portion 130.

The power transmitting coil 112 is electrically connected to the power source portion 130 through the directional coupler 113, and power 300 is supplied from the power source portion 130.

Further, the power transmitting coil 112 is electromagnetically coupled with the power transmitting resonance coil 111 by electromagnetic induction, and the power 300 supplied from the power source portion 130 is supplied to the power transmitting resonance coil 111 through the power transmitting coil 112.

Although the power 300 supplied to the power transmitting resonance coil 111 is transmitted to the power receiving device 200, not all the power 300 is transmitted depending on the power feeding state. For example, in the case where the distance between the power transmitting resonance coil 111 and the power receiving resonance coil 211 is large, or in the case where the resonance frequencies of the power transmitting resonance coil 111 and the power receiving resonance coil 211 are not the same, power that is not transmitted among the power 300 is reflected as the reflected power 320 from the power transmitting resonance coil 111 to the power transmitting coil 112.

The directional coupler 113 has a function of transmitting the reflected power 320 to the switches 121 and 131.

The directional coupler 113, the gate of the switch 121, and one of a source and a drain of the switch 121 are electrically connected to one another. The other of the source and the drain of the switch 121 is electrically connected to a gate of the switch 116.

The directional coupler 113, the gate of the switch 131, and one of a source and a drain of the switch 131 are electrically connected to one another. The other of the source and the drain of the switch 131 is electrically connected to the power source portion 130.

The switch 116 is provided to control a resonance state of the power transmitting resonance coil 111 and the power receiving resonance coil 211. By turning on the switch 116, the power transmitting resonance coil 111 and the power receiving resonance coil 211 are in the resonance state. By turning off the switch 116, the power transmitting resonance coil 111 and the power receiving resonance coil 211 are in a non-resonance state.

In this embodiment, in the resonance state where the switch 116 is ON, the resonant frequency of the power transmitting resonance coil 111 is set to a resonant frequency A which is the same as the resonant frequency of the power receiving resonance coil 211. On the other hand, in the non-resonance state where the switch 116 is OFF, the resonant frequency of the power transmitting resonance coil 111 is set to a resonant frequency A' which is different from the resonant frequency of the power receiving resonance coil 211.

Figure 8A:
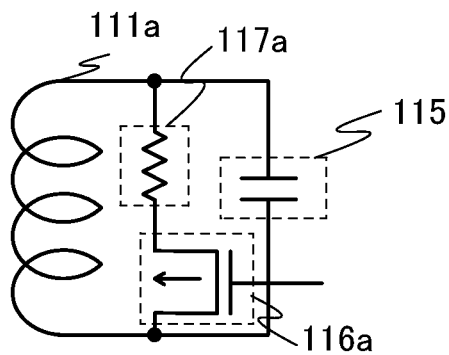
FIGS. 8A to 8C illustrates one embodiment of a power transmitting device.
Figure 8B:
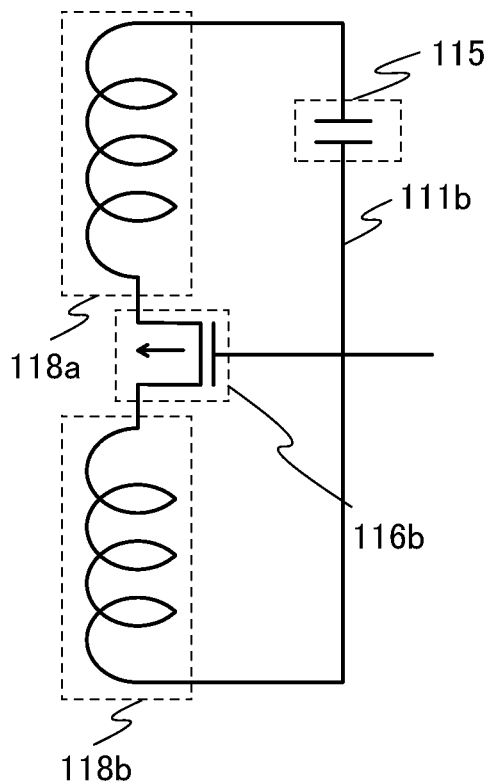
Figure 8C:
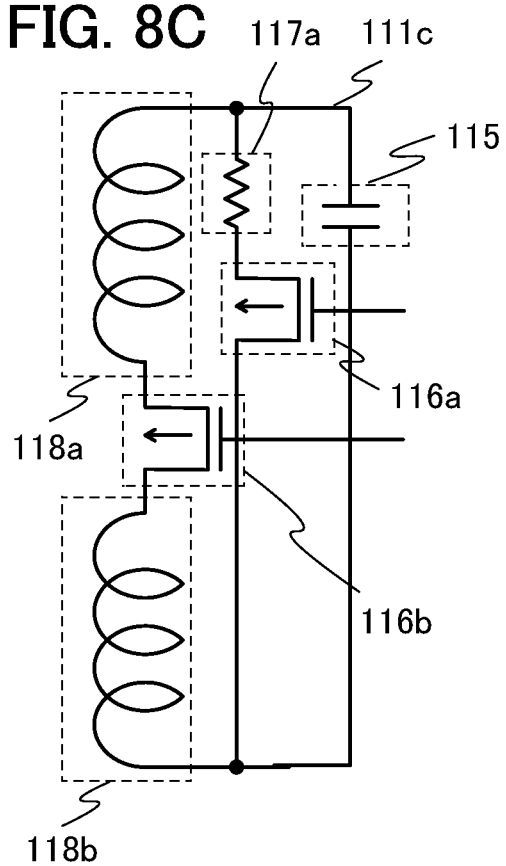

As described above, the power transmitting resonance coil 111 has a function of electrically switching the relation with the power receiving resonance coil 211 from the resonance state to the non-resonance state. FIGS. 8A to 8C are structural examples of the power transmitting resonance coil 111. A power transmitting resonance coil 111a in FIG. 8A includes a resistor 117a serving as a load and a switch 116a between the coil and the resistor 117a. By turning on or off the switch 116a, the resonant frequency of the power transmitting resonance coil 111a can be switched between the resonance state and the non-resonance state.

An example in FIG. 8B is a power transmitting resonance coil 111b including coils 118a and 118b, and a switch 116b between the coils 118a and 118b. By turning on or off the switch 116b, the resonant frequency of the power transmitting resonance coil 111b can be switched between the resonance state and the non-resonance state.

An example in FIG. 8C is a power transmitting resonance coil 111c including a switch 116a between the coils 118a and 118b, and the resistor 117a and the switch 116b between the coils 118a and 118b. By turning on or off the switch 116a or 116b, the resonant frequency of the power transmitting resonance coil 111c can be switched between the resonance state and the non-resonance state. Both or one of the switches 116a and 116b are/is electrically connected to the switch 121.

Resonant frequency A' of the power transmitting resonance coil 111 which is obtained when the switch 116 is OFF is preferably set to a value which is largely different from Resonant frequency A, for example, a sufficiently large value. For example, in the case where Resonant frequency A is 13.56 MHz, Resonant frequency A' of the power transmitting resonance coil 111 which is obtained when the switch 116 is OFF is preferably approximately 100 MHz.

Resonant frequency A of the power transmitting resonance coil 111 can be obtained by determining the shape and the material of the power transmitting resonance coil 111 and the capacitance, the circuit configuration, and the like of the capacitor 115 for adjusting the resonant frequency as appropriate.

Whether power transmission from the power transmitting portion 110 to the power receiving device 200 is kept or stopped is determined depending on the value of the reflected power 320 (the voltage value of reflected power) on the basis of a pre-determined power value (the reference power).

Power is transmitted in a state where resonance occurs between the power transmitting resonance coil 111 and the power receiving resonance coil 211 by turning the switch 116 on. ON/OFF of the switch 116 can be controlled by ON/OFF of the switch 121.

The switch 121 is turned off when power larger than the reference power is inputted as the reflected power 320. The switch 116 is turned on or off by synchronization with the switch 121.

In this embodiment, a p-channel transistor is used as each of the switches 116 and 121. Thus, the threshold voltage of the switch 121 which is a p-channel transistor is set larger than the voltage of the reference power. When power larger than the reference power is inputted to the switch 121 as the reflected power 320, the switch 121 which is a p-channel transistor is turned off. Accordingly, the switch 116 which is a p-channel transistor is also turned off, and the power transmitting resonance coil 111 enters the non-resonance state, i.e., the power transmitting resonance coil 111 is set to have a resonant frequency different from that of the power receiving resonance coil 211 to stop power transmission.

On the other hand, when power smaller than the reference power is inputted as the reflected power 320, the switch 121 which is a p-channel transistor is turned on and accordingly the switch 116 which is a p-channel transistor is also turned on. Thus, the power transmitting resonance coil 111 and the power receiving resonance coil 211 remain in the resonance state and power transmission is kept.

Thus, power transmission can be controlled in the power transmitting portion 110 as follows: power transmission is kept when the reflected power 320 is smaller than the reference power, whereas power transmission is stopped when the reflected power 320 is larger than the reference power.

The switch 131 is turned on when the power transmission efficiency is low and the reflected power 320 is larger than the reference power, due to large distance between the power transmitting resonance coil 111 and the power receiving resonance coil 211, a discrepancy of resonant frequency between the power transmitting resonance coil 111 and the power receiving resonance coil 211, or the like. The reflected power 320 is transmitted to the power source portion 130 (or via the power storage means 145) to recover (circulate) the reflected power 320 in the power transmitting device 100. In this embodiment, since an n-channel transistor is used as the switch 131, the threshold voltage of the switch 131 is set to be smaller than the voltage of the reference power.

On the other hand, when power with higher power transmission efficiency which is smaller than the reference power is inputted as the reflected power 320, the switch 131 is turned off and accordingly electrical connection with the power source portion 130 (and the power storage means 145) is cut to lighten the load.

In particular, the above-described power feeding system includes a determination period (including a monitoring period and a selecting period) for determining whether the first condition and the second condition are satisfied or not. In this determination period, the reflected power 320 which is not transmitted to the power receiving device 200 and reflected into the power transmitting device 100 is increased because power transmission efficiency is not optimized. For this reason, it is advantageous that the reflected power 320 is recovered in the power transmitting device 100 to be reused for power transmission, as in the power feeding system and method disclosed in this specification. Since the power transmitting device 100 has the power-circulating function, power use efficiency can be improved.

In addition, although not illustrated, a switch may be provided between the directional coupler 113 and the power source portion 130 in the power transmitting portion 110. With the switch, power supply from the power source portion 130 to the power transmitting coil 112 can be controlled. For example, power transmission is not performed, the switch between the directional coupler 113 and the power source portion 130 is turned off, whereby power supply from the power source portion 130 to the power transmitting coil 112 can be stopped. When each of the power transmitting portions 110 can select whether or not power is supplied from the power source portion 130, power can be supplied to only the power transmitting portion 110 which needs to transmit power at this moment, and power supply to the power transmitting portion 110 which does not need to transmit power at this moment can be stopped. Thus, power consumption of the power transmitting device 100 can be reduced.

Figure 4:
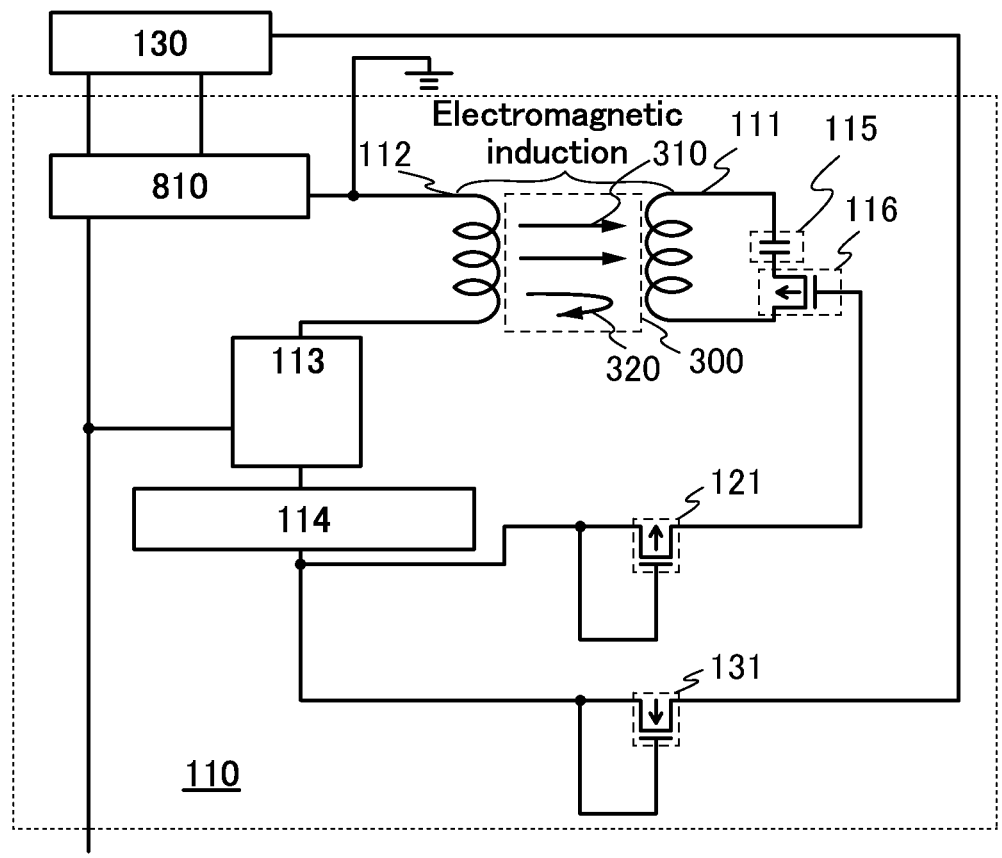
FIG. 4 illustrates one embodiment of a power transmitting device.

Note that the power transmitting portions 110 illustrated in FIGS. 2A and 2B can be each provided with a matching circuit 810 as appropriate, as illustrated in FIG. 4.

Figure 3A:
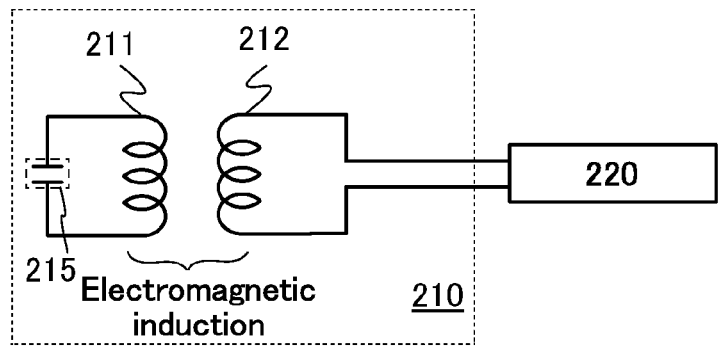
FIGS. 3A and 3B illustrate one embodiment of a power receiving device.
Figure 3B:
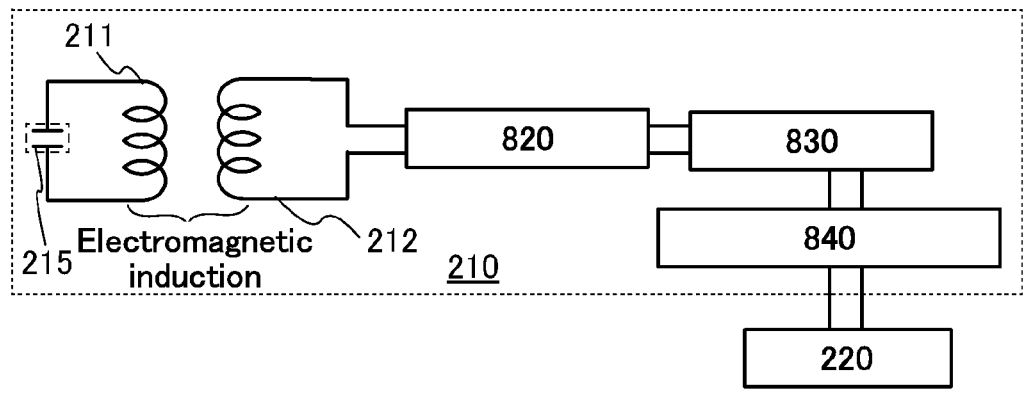

Specific examples of the power receiving portion 210 are shown in FIGS. 3A and 3B.

The power receiving portion 210 illustrated in FIGS. 3A and 3B includes the power receiving resonance coil 211 and the power receiving coil 212. In this embodiment, the resonant frequency of the power receiving resonance coil 211 is Resonant frequency A which is determined by determining the shape and the material of the power receiving resonance coil 211 and the capacitance, the circuit, and the like of the capacitor 215 for adjusting the resonant frequency as appropriate at the time of forming the power receiving resonance coil 211.

The power transmitting resonance coil 111 and the power receiving resonance coil 211 are electromagnetically coupled strongly to each other (magnetic resonance coupling) only in the case where the resonance frequencies are the same, and thus the power receiving resonance coil 211 can receive the power 310 from the power transmitting resonance coil 111.

Since the resonant frequency of the power transmitting resonance coil 111 in which the switch 116 is ON and the resonant frequency of the power receiving resonance coil 211 are both Resonant frequency A, the power receiving resonance coil 211 can receive the power 310 from the power transmitting resonance coil 111 in which the switch 116 is ON.

The power receiving resonance coil 211 is electromagnetically coupled with the power receiving coil 212 by electromagnetic induction, and the power 310 supplied from the power transmitting resonance coil 111 is supplied to the power receiving coil 212 via the power receiving resonance coil 211.

The power receiving coil 212 is electrically connected to the load portion 220. The load portion 220 stores (charges) the power 310 which the power receiving coil 212 receives from the power receiving resonance coil 211.

The load portion 220 is a power storage means such as a secondary battery, and for example, a nickel-cadmium battery, a nickel-hydride battery, or a lithium-ion battery can be used.

Further, the power receiving portion 210 illustrated in FIG. 3A can be provided with a matching circuit 820, a rectifier circuit 830, and a DC-DC converter 840 as appropriate, as illustrated in FIG. 3B.

A semiconductor element having switching characteristics (e.g., a transistor) can be used not only for the switches 116, 121, and 131 but also for a circuit such as the power source portion 130, the directional coupler 113, the AC-DC converter 114, the matching circuit 810, the matching circuit 820, the rectifier circuit 830, the DC-DC converter 840, and the load portion 220, which are included in the power transmitting device 100 and the power receiving device 200 used in the power feeding system described in this embodiment.

As a semiconductor material used for the semiconductor element, for example, a silicon based material such as silicon, silicon carbide, or silicon germanium; a compound semiconductor material such as gallium arsenide; and an oxide semiconductor material such as an oxide containing indium (In), gallium (Ga), and zinc (Zn) (an In—Ga—Zn—O-based oxide) can be given.

The power transmitting device 100 and the power receiving device 200 which are used in the power feeding system are mainly used outdoors; therefore, they are often used in severe temperature environment, particularly, under high temperatures due to a climate or the weather. A semiconductor element (a transistor) including an oxide semiconductor can maintain favorable switching characteristics even in severe high temperature environment. Accordingly, the use of a semiconductor element including an oxide semiconductor enables the power transmitting device 100 and the power receiving device 200 to have high reliability, so that a smooth power feeding service can be offered when the power feeding system and the power feeding method which are described in this embodiment are used.

In the power feeding system and the power feeding method in this embodiment, a resonance method (also referred to as resonant method) using a power transmitting device which detects the power feeding state and includes a plurality of adjacently provided power transmitting portions each of which independently controls the start, the continuation, and the stop of power transmission to a power receiving device is employed. Power feeding between the power transmitting device and the power receiving device is performed using a magnetic resonance phenomenon which is generated between resonance coils which are included in a power transmitting portion and a power receiving portion and have the same resonant frequency.

The power feeding system and the power feeding method in this embodiment are configured to perform power feeding in the case where a first condition and a second condition are satisfied.

Under the first condition, the power transmitting resonance coil is resonant with the power receiving resonance coil. When the power transmitting resonance coil and the power receiving resonance coil have the same resonant frequency, they can be resonant with each other.

Further, power transmission efficiency is increased when the distance between the power transmitting resonance coil and the power receiving resonance coil is small, whereas it is decreased when the distance therebetween is large. Thus, under the second condition, power is transmitted by the power transmitting portion, among a plurality of power transmitting portions provided in the power transmitting device, which includes a power transmitting resonance coil most close to the power receiving resonance coil.

The power feeding system and the power feeding method in this embodiment includes a determination period (including a monitoring period and a selecting period) for determining whether the first condition and the second condition are satisfied or not. In this determination period, the reflected power which is not transmitted to the power receiving device and reflected into the power transmitting device side is increased because power transmission efficiency is not optimized. For this reason, it is advantageous that the reflected power is recovered in the power transmitting device to be reused for power transmission, as in the power feeding system and the power feeding method in this embodiment. Since the power transmitting device has the power-circulating function, power use efficiency can be improved.

The power feeding system including the determination period (including a monitoring period and a selecting period) and the power feeding method in this embodiment are described with reference to the conceptual view of FIG. 7.

Figure 7:
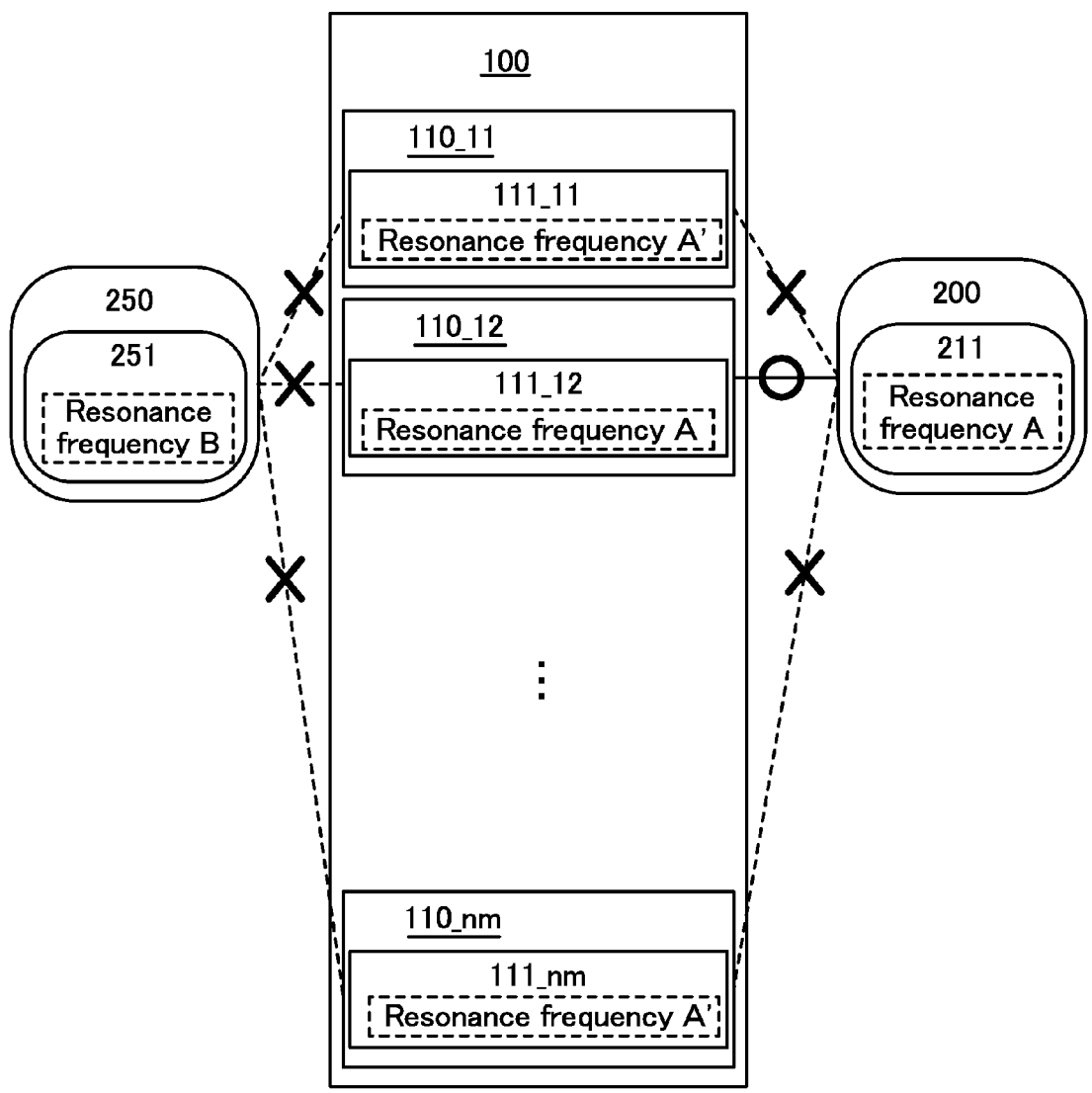
FIG. 7 illustrates an example of power feeding using a power feeding system.

In FIG. 7, the power transmitting device 100 includes the plurality of power transmitting portions 110_11 to 110_$nm$. The plurality of power transmitting portions 110_11 to 110_$nm$ include the power transmitting resonance coils 111_11 to 111_$nm$, respectively. The resonant frequency of each of the power transmitting resonance coils 111_11 to 111_$nm$ can be set to Resonant frequency A or Resonant frequency A' by electrically switching Resonant frequency A and Resonant frequency A'. A power receiving device 250 including a power receiving resonance coil 251 having Resonant frequency B and a power receiving device 200 including the power receiving resonance coil 211 having Resonant frequency A are provided close to the power transmitting device 100.

In order to feed power to the power receiving resonance coil included in the power receiving device from the power transmitting resonance coil by a magnetic resonance phenomenon, the power receiving resonance coil needs to be resonant with the power transmitting resonance coil, i.e., the resonant frequency of the power transmitting resonance coil needs to be the same as that of the power receiving resonance coil (the first condition).

Accordingly, power is not transmitted from the power transmitting portions 110_11 to 110_$nm$ including the power transmitting resonance coils 111_11 to 111_$nm$, respectively, each having Resonant frequency A or Resonant frequency A', to the power receiving device 250 including the power receiving resonance coil 251 having Resonant frequency B because of the different resonance frequencies. Note that in FIG. 7, the case where power is transmitted from the power transmitting portions 110_11 to 110_nm to the power receiving device 200 or the power receiving device 250 is indicated by a circle, and the case where power is not transmitted is indicated by a cross mark.

The value of the resonant frequency given to the coil is peculiar to the coil regardless of whether the number of the resonance frequencies is one or more and is determined depending on the shape, the material, or the circuit configuration of the capacitor or the like at the time of forming the power transmitting resonance coil and the power receiving resonance coil. Accordingly, the resonant frequency functions as identification information, and thus the power transmitting device and the power receiving device, and further, a power feeding provider and a power feeding user can be identified and managed or can identify and manage each other based on the identification information. The resonant frequency has high safety because it is determined depending on the physical conditions for manufacturing the coil and is unlikely to be falsified as compared to the case where identification of information is performed by an electrical signal.

In the power feeding service (the power feeding system and the power feeding method) in this embodiment, whether power is fed or not is determined depending on whether the resonance frequencies match or not, and thus the resonance frequencies are the key to power feeding, and resonance coils having a specific resonant frequency are mounted on a power transmitting device and a power receiving device between which a contract for power feeding has been made in advance, whereby only contractants can receive the safe power feeding service. Accordingly, even when a power feeding provider increases the size of the power transmitting device in order to increase the power feeding efficiency and puts the power transmitting device in a place where an unspecified number of power receiving devices (power feeding users) pass or gather, such as a road or a square, the power feeding service can be offered to only specific power receiving devices (power feeding users) by identification with the resonance frequencies.

On the other hand, the power receiving device 200 can receive power from the power transmitting device 100 because the power receiving resonance coil 211 of the power receiving device 200 has Resonant frequency A which the power transmitting resonance coils 111_11 to 111_nm included in the power transmitting device 100 can have.

Power transmission starts by setting the resonance frequencies of the power transmitting resonance coils 111_11 to 111_nm which are included in the power transmitting portions 110_11 to 110_nm in the power transmitting device 100, respectively, to Resonant frequency A (i.e., the resonant state) which is the same as the resonant frequency of the power receiving resonance coil 211 included in the power receiving device 200. On the other hand, power transmission stops by setting the resonance frequencies of the power transmitting resonance coils 111_11 to 111_nm which are included in the power transmitting portions 110_11 to 110_nm, respectively, to Resonant frequency A' (i.e., the non-resonant state) which is different from Resonant frequency A of the power receiving resonance coil 211.

The power transmitting device 100 including the plurality of power transmitting portions 110_11 to 110_nm as described in this embodiment has a large power transmitting region, and thus can transmit power to a plurality of power receiving devices at the same time or to power receiving devices with a variety of sizes from small to large and a variety of shapes. Accordingly, the following advantages can be obtained: the power transmitting device 100 is convenient for a power receiving device of a power feeding user, and the power transmitting device 100 of a power feeding provider can have high power supply ability to offer power feeding service to more power feeding users (power receiving devices) in a shorter time.

Further, in power feeding using the resonance method, unlike power feeding using an electromagnetic coupling method, power is transmitted, power is transmitted only in a state where the resonant frequency of the power receiving resonance coil 211 is the same as the resonance frequencies of one or more of the power transmitting resonance coils 111_11 to 111_nm, so that power loss at the time of power feeding can be lowered.

However, the power transmitting device 100 including the plurality of power transmitting portions 110_11 to 110_nm which is described in this embodiment has a structure in which the power transmitting resonance coils 111_11 to 111_nm which are provided in the power transmitting portions 110_11 to 110_nm, respectively, are provided close to each other, and thus a magnetic resonance phenomenon occurs between any two of the plurality of power transmitting resonance coils 111_11 to 111_nm, which causes transmission and reception of power between any two of the plurality of power transmitting resonance coils 111_11 to 111_nm. Such transmission and reception of power between any two of the power transmitting portions 110_11 to 110_nm causes loss of power which is to be transmitted to the power receiving device 200, resulting in a reduction in efficiency of power transmission from the power transmitting device 100 to the power receiving device 200.

Therefore, in the power feeding system and the power feeding method in this embodiment, only the resonant frequency of the power transmitting resonance coil 111_12 which is closest to the power receiving resonance coil 211 and has high power transmission efficiency is set to Resonant frequency A which is the same as the resonant frequency of the power receiving resonance coil 211, and the resonance frequencies of the power transmitting resonance coils 111_1 and 111_13 to 111_nm are set to Resonant frequency A' which is different from Resonant frequency A of the power receiving resonance coil 211.

Only the power transmitting portion 110_12 including the power transmitting resonance coil 111_12 whose resonant frequency is set to Resonant frequency A which is the same as the resonant frequency of the power receiving resonance coil 211 continues power transmission to the power receiving device 200, and the power transmitting portions 110_11 and 110_13 to 110_nm including the power transmitting resonance coils 111_1 and 111_3 to 111_m whose resonance frequencies are set to Resonant frequency A' different from the resonant frequency of the power receiving resonance coil 211 stop power transmission to the power receiving device 200 (the second condition).

Accordingly, since Resonant frequency A of the power transmitting resonance coil 111_12 which transmits power is different from Resonant frequency A' of each of the power transmitting resonance coils 111_11 and 111_13 to 111_nm which are provided adjacent to and in the periphery of the power transmitting resonance coil 111_12, transmission and reception of power due to a magnetic resonance phenomenon does not occur between any two of the power transmitting resonance coils 111_11 to 111_nm. Thus, power can be fed from the power transmitting device 100 to the power receiving device 200 with high power transmission efficiency.

Switching from Resonant frequency A of the power receiving resonance coil 211 to Resonant frequency A' different from Resonant frequency A can be controlled as follows: in each of the power transmitting portions 110, the switch 121 detects the reflected power 320 which is not transmitted to the power receiving resonance coil 211 and is reflected from any of the power transmitting resonance coils 111_11 to 111_$nm$, and determines using a reference power value which is set in advance.

Further, the positional relation between the power transmitting device 100 and the power receiving device 200 at the start of power feeding, in the middle thereof, and at the end thereof may be changed depending on the usage mode of power feeding in the case where power feeding is performed while the power receiving device 200 is being moved, for example, the case where the power receiving device 200 is a portable power receiving device or a moving means such as a car. In this case, the power transmission efficiency of the power transmitting portion 110_12 including the power transmitting resonance coil 111_12 changes over time.

Therefore, after the resonance frequencies of the power transmitting resonance coils 111_11 and 111_13 to 111_$nm$ are set to Resonant frequency A' different from the resonant frequency of the power receiving resonance coil 211, the resonance frequencies of the power transmitting resonance coils 111_11 and 111_13 to 111_$nm$ are set to Resonant frequency A which is the same as the resonant frequency of the power receiving resonance coil 211 every predetermined period, and setting to Resonant frequency A or Resonant frequency A' is controlled as follows: the switch 121 detects and determines the current reflected power 320, and whether power is transmitted or not is determined.

Next, the power feeding method using the power feeding system is described with reference to a flow chart in FIG. 5.

FIG. 5 illustrates an example of the power feeding system and the power feeding method in which power is fed from the power transmitting portion 110 which is one of the plurality of power transmitting portions 110_11 to 110_$nm$ included in the power transmitting device 100 to the power receiving device 200.

First, in the power transmitting portion 110, power smaller than the reference power is supplied from the power source portion 130 to turn off the switch 131 (S1) and turn on the switch 121 (S2), whereby the switch 116 is turned on (S3).

By turning on the switch 116, the resonant frequency of the power transmitting resonance coil 111 is set to Resonant frequency A which is the same as the resonant frequency of the power receiving resonance coil 211 (S4).

The power transmitting coil 112 receives the power 300 from the power source portion 130 and transmits the power 300 to the power transmitting resonance coil 111 which is electromagnetically coupled with the power transmitting coil 112 by electromagnetic induction (S5). In the case where the resonant frequency of the power receiving resonance coil 211 is Resonant frequency A and the resonance frequencies of the power transmitting resonance coil 111 and the power receiving resonance coil 211 are the same (in the case where the resonant frequency of the power receiving resonance coil 211 included in the power receiving portion 210 of the power receiving device 200 is Resonant frequency A as in FIG. 7), the power transmitting resonance coil 111 transmits the received power 300 to the power receiving device 200 (S6).

The power receiving resonance coil 211 in the power receiving portion 210 of the power receiving device 200 receives the transmitted power 300 and transmits the power 300 to the power receiving coil 212 which is electromagnetically coupled with the power receiving resonance coil 211 by electromagnetic induction (J1).

The power receiving coil 212 transmits the received power 300 to the load portion 220 (J2), and the load portion 220 receives the power 300 (J3). Thus, power can be fed from the power transmitting portion 110 of the power transmitting device 100 to the power receiving device 200.

For example, in the case where the resonant frequency of the power receiving resonance coil is Resonant frequency C and the resonance frequencies of the power transmitting resonance coil 111 and the power receiving resonance coil are not the same, the power transmitting resonance coil 111 is not resonant with the power receiving resonance coil and accordingly magnetic resonance coupling does not occur between the power transmitting resonance coil 111 and the power receiving resonance coil; thus, the power transmitting resonance coil 111 does not transmit power to the power receiving resonance coil, and the power 300 transmitted from the power transmitting coil 112 is reflected as the reflected power 320 to the power transmitting coil 112 (the first condition).

Further, in the case where the power transmitting resonance coil 111 and the power receiving resonance coil 211 are not close to each other even if the resonant frequency of the power receiving resonance coil 211 is Resonant frequency A and the resonance frequencies of the power transmitting resonance coil 111 and the power receiving resonance coil 211 are the same, the power transmission efficiency is decreased, and thus the power transmitting resonance coil 111 transmits only power 310 which is part of the power 300 and reflects the power 300 excluding the power 310 to the power transmitting coil 112 as the reflected power 320 (the second condition).

The directional coupler 113 between the power source portion 130 and the power transmitting coil 112 separates the reflected power 320 and power for transmission which is supplied from the power source portion 130 (S7) and transmits the reflected power 320 to the switches 121 and 131.

Since the reflected power 320 is power which has not transmitted from the power transmitting resonance coil 111 to the power receiving resonance coil 211, it can be determined that the smaller the reflected power 320 is, the higher the efficiency of power transmission from the power transmitting portion 110 to the power receiving device 200 is, and as the larger the reflected power 320 is, the lower the power transmission efficiency is.

If the reflected power 320 is smaller than the reference power, the switch 121 remains ON and thus the switch 116 also remains ON and the power transmitting resonance coil 111 remains resonant with the power receiving resonance coil 211, so that power transmission is kept (back to S5).

If the reflected power 320 is larger than the reference power, the switch 131 is turned on (S11) and the reflected power 320 is transmitted to the power storage means 145 to be stored (S12). The power storage means 145 transmits the stored reflected power 320 to the power source portion 130 as appropriate (S13). Thus, the reflected power 320 is transmitted to the power source portion 130 (or via the power storage means 145) to recover (circulate) the reflected power 320 in the power transmitting device.

If the reflected power 320 is larger than the reference power, the switch 121 is turned off (S8); accordingly, the switch 116 is also turned off (S9), the resonant frequency of the power transmitting resonance coil 111 is set to the resonant frequency A' (S10), and the power receiving resonance coil 211 is in the non-resonance state, whereby power transmission is stopped.

Note that if the inputted reflected power 320 is smaller than the reference power due to increased power transmission efficiency or stop of power supply from the power source portion 130, the switch 131 is turned off, whereby electrical connection with the power source portion 130 (and the power storage means 145) is cut to lighten the load.

In the power transmitting portion 110 where power transmission has been stopped, the switch 131 is turned off again (S1) and the switch 121 is turned on (S2) after a predetermined period of time, the power transmission state is determined based on the value of the reflected power 320 so that whether power is transmitted or not is determined.

Thus, power can be transmitted (supplied) with higher power use efficiency and power transmission efficiency.

As described in this embodiment, the power recovering function (circulation function) is provided for the power transmitting device, so that use efficiency of power for transmission can be improved.

A power feeding system and a power feeding method using a resonance method in which a power transmitting region (a region from which power can be supplied) is increased and power can be supplied with high power transmission efficiency (high power supply efficiency) can be provided using a power transmitting device including a plurality of power transmitting portions each including a power transmitting resonance coil.

A power feeding system and a power feeding method in which a power feeding provider (a power transmitting device) can have a high power supply ability to offer power feeding service to more power feeding users (power receiving devices) in a shorter time can be provided.

A power feeding system and a power feeding method which can offer a power feeding service which is efficient to both a power feeding user and a power feeding provider can be provided.

This embodiment can be implemented in appropriate combination with the structures described in the other embodiments.

Embodiment 2

In this embodiment, one embodiment in which the power receiving device is incorporated in an electric propulsion vehicle such as an electric vehicle in the power feeding system and the power feeding method which are described in Embodiment 1 will be described with reference to FIGS. 6A1 to 6C2.

Note that the power receiving device can be incorporated in portable electronic devices such as digital video cameras, portable information terminals (e.g., mobile computers, mobile phones, portable game consoles, and e-book readers), and image reproducing devices including a recording medium (specifically digital versatile disc (DVD) reproducing devices) in addition to an electric propulsion vehicle such as an electric vehicle. Power can be fed to the electronic devices, in each of which the power receiving device is incorporated, in such a manner that the electronic devices are held and placed in a region capable of power feeding by users.

The power feeding system and the power feeding method in this embodiment can be used for any object that can be driven by electric power.

FIGS. 6A1 to 6C2 illustrate an example of feeding power to an electric car 150 that is an electric propulsion vehicle by the power transmitting device, the power feeding system, and the power feeding method which are described in Embodiment 1.

Note that FIGS. 6A1, 6B1, and 6C1 are top views illustrating the state of power feeding. FIGS. 6A2, 6B2, and 6C2 show the state (ON or OFF) of the switches 121, 116, and 131 in the power transmitting portions 110_11 to 110_33.

An example of a power feeding system shown in FIGS. 6A1 to 6C2 includes the power transmitting device 100 composed of the plurality of power transmitting portions 110_11 to 110_33 arranged in matrix and an electric car 150 including the power receiving device 200. The power transmitting device 100 is provided on the ground.

The power transmitting device 100 includes the plurality of power transmitting portions 110_11 to 110_33 each including a power receiving resonance coil which is included in the power receiving device and a power transmitting resonance coil which can be switched between the resonance state and the non-resonance state. The resonance state and the non-resonance state can be switched by electrically switching the resonant frequency of the power transmitting resonance coil to the resonant frequency A or the resonant frequency A'.

The electric car 150 including the power receiving device 200 which includes a power receiving resonance coil having Resonant frequency A is placed in a power transmitting region including the plurality of power transmitting portions 110_11 to 110_33 in the power transmitting device 100. In this embodiment, the case in which a user of the electric car 150 and a provider of the power transmitting device 100 have a contractual relationship with each other and the electric car 150 includes, in advance, the power receiving device 200 including the power receiving resonance coil having Resonant frequency A which is the same as the resonant frequency of the power transmitting resonance coil included in the power transmitting device 100 so that power can be fed to the electric car 150 by the power transmitting device 100 is described.

The value of Resonant frequency A given to the coil is peculiar to the coil regardless of whether the number of the resonance frequencies is one or more and is determined depending on the shape and the material of the coil and the circuit configuration of a capacitor or the like at the time of forming the power transmitting resonance coil and the power receiving resonance coil. Accordingly, Resonant frequency A functions as identification information, and thus the power transmitting device 100 and the power receiving device 200, and further, a power feeding provider and a power feeding user can be identified and managed or can identify and manage each other based on the identification information. Resonant frequency A has high safety because it is determined depending on the physical conditions for manufacturing the coil and is unlikely to be falsified as compared to the case where identification of information is performed by an electrical signal.

The resonance coils having Resonant frequency A are mounted on the power transmitting device 100 and the power receiving device 200 between which a contract for power feeding has been made in advance, whereby only contractants can receive safe power feeding service. Accordingly, even when a power feeding provider increases the size of a power transmitting device like the power transmitting device 100 and puts the power transmitting device on a road or in parking where an unspecified number of power receiving devices (power feeding users) pass or park, the power feeding service can be offered to only the specific electric car 150 including the power receiving device 200 by identification with the resonance frequencies.

The large-sized power transmitting device 100 including the plurality of power transmitting portions 110_11 to 110_*nm* as described in this embodiment can provide a large power transmitting region, and thus can transmit power to an electric propulsion vehicle and an electronic device each including a plurality of power receiving devices or to an electric propulsion vehicle and an electronic device including power receiving devices with a variety of sizes from small to large and a variety of shapes at the same time. Accordingly, the following advantages can be obtained: the power transmitting device 100 is convenient for a power feeding user (an electric propulsion vehicle and an electronic device each including a power receiving device), and a power feeding provider (the power transmitting device 100) can have high power supply ability to offer power feeding service to more power feeding users (electric propulsion vehicles and electronic devices each including a power receiving device) in a shorter time.

Power is fed from the power transmitting device 100 to the electric car 150 including the power receiving device 200.

First, in the power feeding service (power feeding system and power feeding method) between the power transmitting device 100 and the electric car 150 including the power receiving device 200, the resonance coil is resonant with the power receiving resonance coil. In other words, the resonant frequency of the power transmitting resonance coil included in the power transmitting device 100 is set to the resonant frequency A which is the same as the resonant frequency A of the power receiving resonance coil included in the power receiving device 200. As described in Embodiment 1, the switches 121 and 116 are turned on and the switch 131 is turned off to set the resonant frequency of the power transmitting resonance coil to the resonant frequency A (see FIG. 6A2).

Next, the case where the power receiving device 200 included in the electric car 150 as shown in FIG. 6B1 is provided in the power transmitting device 100 of FIG. 6A1 most close to the power transmitting portion 110_22 of the power transmitting device 100 will be described. In the power transmitting portion 110_22 most close to the power receiving device 200, the power transmission efficiency is high and thus the reflected power reflected to the power transmitting portion 110_22 is smaller than the reference power. Accordingly, the switches 121 and 116 are ON and the switch 131 is OFF, and power transmission is kept. On the other hand, in the power transmitting portions 110_11 to 110_21 and 110_23 to 110_33 (other than the power transmitting portion 110_22), the power transmission efficiency is low and the reflected power is larger than the reference power because they are apart from the power receiving device 200. Thus, the switches 121 and 116 are turned off, whereby power transmission is stopped. Further, the switch 131 is turned on, whereby the reflected power is recovered and is transmitted to the power source portion (the power storage means).

In this case, the resonant frequency of only the power transmitting portion 110_22 is the resonant frequency A, and each of the resonant frequency of the power transmitting portions 110_11 to 110_21 and 110_23 to 110_33 adjacent to and around the power transmitting portion 110_22 is the resonant frequency A'.

Thus, in the power transmitting device 100, the resonant frequency A of the power transmitting resonance coil of the power transmitting portion 110_22 is different from the resonant frequency A' of the power transmitting resonance coils included in the power transmitting portions 110_11 to 110_21 and 110_23 to 110_33 adjacent to and around the power transmitting portion 110_22. Accordingly, transmission and reception of power due to a magnetic resonance phenomenon do not occur between the power transmitting resonance coil of the power transmitting portion 110_22 and the power transmitting resonance coils of the adjacent power transmitting portions 110_11 to 110_21 and 110_23 to 110_33. Thus, power can be fed from the power transmitting device 100 to the power receiving device 200 with high power transmission efficiency.

Then, the case where, as shown in FIG. 6C1, the electric car 150 moves away from the power transmitting device 100 which is in the state of FIG. 6A2 will be described. Also in the power transmitting portion 110_22, the reflected power is larger than the reference power because the power receiving device 200 to which power is transmitted does not exist. Thus, in all the power transmitting portions 110_11 to 110_33, the resonant frequency of the power transmitting coil is set to the resonant frequency A', the switches 121 and 116 are turned off to stop power transmission, and the switch 131 is turned on to recover the reflected power and transmit it to the power source portion (the power storage means).

Note that although FIGS. 6A1 to 6C2 illustrate an example in which the power transmitting device 100 is provided on the ground, the power transmitting device 100 may be provided on a side surface (wall) or a top surface (ceiling).

As described in this embodiment, the power recovering function (circulation function) is provided for the power transmitting device, so that use efficiency of power for transmission can be improved.

A power feeding system and a power feeding method using a resonance method in which a power transmitting region (a region from which power can be supplied) is increased and power can be supplied with high power transmission efficiency (high power supply efficiency) can be provided using a power transmitting device including a plurality of power transmitting portions each including a power transmitting resonance coil.

A power feeding system and a power feeding method in which a power feeding provider (a power transmitting device) can have a high power supply ability to offer power feeding service to more power feeding users (power receiving devices) in a shorter time can be provided.

A power feeding system and a power feeding method which can offer a power feeding service which is efficient to both a power feeding user and a power feeding provider can be provided.

This embodiment can be implemented in appropriate combination with the structures described in the other embodiments.

This application is based on Japanese Patent Application serial No. 2012-157074 filed with Japan Patent Office on Jul. 13, 2012, the entire contents of which are hereby incorporated by reference.

What is claimed is:

1. A power transmitting device comprising:
   a plurality of adjacent power transmitting portions; and
   a power source portion electrically connected to the plurality of adjacent power transmitting portions,
   the plurality of adjacent power transmitting portions each comprising:
      a power transmitting coil configured to be supplied with power from the power source portion and including a first switch;
      a power transmitting resonance coil which is electromagnetically coupled with the power transmitting coil by electromagnetic induction; and
      a directional coupler which inputs reflected power reflected from the power transmitting resonance coil to a second switch and a third switch,
   wherein the second switch is turned on when the inputted reflected power is smaller than reference power,
   wherein the third switch is turned on when the inputted reflected power is larger than the reference power, wherein the first switch is turned on when the second switch is turned on, wherein the power transmitting device is in a power transmitting state when the first switch is turned on, and wherein the power transmitting device is in a non-power transmitting state when the first switch is turned off.

2. The power transmitting device according to claim 1, further comprising:

a power storage means between the third switch and the power source portion.

3. The power transmitting device according to claim 1, wherein the first switch and the second switch are p-channel transistors, and wherein the third switch is an n-channel transistor.

4. The power transmitting device according to claim 1, wherein the directional coupler, a gate and one of a source and a drain of a second transistor, and a gate and one of a source and a drain of a third transistor are electrically connected, wherein the other of the source and the drain of the second transistor is electrically connected to a gate of the first transistor, wherein the other of the source and the drain of the third transistor is electrically connected to the power source portion.

5. A power feeding system comprising:

the power transmitting device according to claim 1; and a power receiving device including a power receiving portion and a load portion which is electrically connected to the power receiving portion, wherein the power receiving portion in the power receiving device comprises a power receiving coil for supplying power to the load portion and a power receiving resonance coil which is not in contact with the power transmitting coil and is electromagnetically coupled with the power receiving coil by electromagnetic induction, and wherein the power transmitting resonance coil is resonant with the power receiving resonance coil in the power transmitting state.

6. A power feeding method using the power feeding system according to claim 5 and comprising the steps of:

a first step in which, in the plurality of adjacent power transmitting portions, the third switch is turned off and the first switch and the second switch are turned on to set the power transmitting device into the power transmitting state;

a second step in which, in the power transmitting coil, power supplied from the power source portion is transmitted to the power transmitting resonance coil;

a third step in which, in the power transmitting resonance coil, power is transmitted to the power receiving device; and a fourth step in which power reflected by the power transmitting resonance coil in the third step is inputted to the second switch and the third switch via the directional coupler, wherein when the reflected power is smaller than the reference power in the fourth step, the first switch and the second switch remain ON and the power transmitting device maintains the power transmitting state and also the third step and the fourth step are repeated, and wherein when the reflected power is larger than the reference power in the fourth step, the first switch and the second switch are turned off and the power transmitting device is in the non-power transmitting state and also the third switch is turned on to transmit the reflected power to the power source portion via the third switch.

7. The power feeding method according to claim 6, wherein a resonant frequency of the power transmitting resonance coil is different between the power transmitting state and the non-power transmitting state.

8. A power transmitting device comprising:

a plurality of adjacent power transmitting portions; and a power source portion electrically connected to the plurality of adjacent power transmitting portions, the plurality of adjacent power transmitting portions each comprising:

a power transmitting coil configured to be supplied with power from the power source portion and including a first switch;

a power transmitting resonance coil which is electromagnetically coupled with the power transmitting coil by electromagnetic induction;

a directional coupler which inputs reflected power reflected from the power transmitting resonance coil to a second switch and a third switch; and a power storage means configured to store the inputted reflected power when the third switch is turned on, wherein the second switch is turned on when the inputted reflected power is smaller than reference power, wherein the third switch is turned on when the inputted reflected power is larger than the reference power, wherein the first switch is turned on when the second switch is turned on, wherein the power transmitting device is in a power transmitting state when the first switch is turned on, and wherein the power transmitting device is in a non-power transmitting state when the first switch is turned off.

9. The power transmitting device according to claim 8, wherein the first switch and the second switch are p-channel transistors, and wherein the third switch is an n-channel transistor.

10. The power transmitting device according to claim 8, wherein the directional coupler, a gate and one of a source and a drain of a second transistor, and a gate and one of a source and a drain of a third transistor are electrically connected, wherein the other of the source and the drain of the second transistor is electrically connected to a gate of the first transistor, wherein the other of the source and the drain of the third transistor is electrically connected to the power source portion.

11. A power feeding system comprising:

the power transmitting device according to claim 8; and a power receiving device including a power receiving portion and a load portion which is electrically connected to the power receiving portion, wherein the power receiving portion in the power receiving device comprises a power receiving coil for supplying power to the load portion and a power receiving resonance coil which is not in contact with the power transmitting coil and is electromagnetically coupled with the power receiving coil by electromagnetic induction, and wherein the power transmitting resonance coil is resonant with the power receiving resonance coil in the power transmitting state.

12. A power feeding method using the power feeding system according to claim 11 and comprising the steps of:

a first step in which, in the plurality of adjacent power transmitting portions, the third switch is turned off and the first switch and the second switch are turned on to set the power transmitting device into the power transmitting state;

a second step in which, in the power transmitting coil, power supplied from the power source portion is transmitted to the power transmitting resonance coil;

a third step in which, in the power transmitting resonance coil, power is transmitted to the power receiving device; and a fourth step in which power reflected by the power transmitting resonance coil in the third step is inputted to the second switch and the third switch via the directional coupler, wherein when the reflected power is smaller than the reference power in the fourth step, the first switch and the second switch remain ON and the power transmitting device maintains the power transmitting state and also the third step and the fourth step are repeated, and wherein when the reflected power is larger than the reference power in the fourth step, the first switch and the second switch are turned off and the power transmitting device is in the non-power transmitting state and also the third switch is turned on to transmit the reflected power to the power source portion via the third switch.

13. The power feeding method according to claim 12, wherein a resonant frequency of the power transmitting resonance coil is different between the power transmitting state and the non-power transmitting state.

14. A power transmitting device comprising:
a power transmitting portion; and
a power source portion electrically connected to the power transmitting portion,
the power transmitting portion comprising:
  a power transmitting coil configured to be supplied with power from the power source portion and including a first switch;
  a power transmitting resonance coil which is electromagnetically coupled with the power transmitting coil by electromagnetic induction; and
  a directional coupler which inputs reflected power reflected from the power transmitting resonance coil to a second switch and a third switch,
wherein the second switch is turned on when the inputted reflected power is smaller than reference power,
wherein the third switch is turned on when the inputted reflected power is larger than the reference power,
wherein the first switch is turned on when the second switch is turned on,
wherein the power transmitting device is in a power transmitting state when the first switch is turned on, and
wherein the power transmitting device is in a non-power transmitting state when the first switch is turned off.

15. The power transmitting device according to claim 14, further comprising:
a power storage means between the third switch and the power source portion.

16. The power transmitting device according to claim 14, wherein the first switch and the second switch are p-channel transistors, and
wherein the third switch is an n-channel transistor.

17. The power transmitting device according to claim 14, wherein the directional coupler, a gate and one of a source and a drain of a second transistor, and a gate and one of a source and a drain of a third transistor are electrically connected,
wherein the other of the source and the drain of the second transistor is electrically connected to a gate of the first transistor,
wherein the other of the source and the drain of the third transistor is electrically connected to the power source portion.

18. A power feeding system comprising:
the power transmitting device according to claim 14; and
a power receiving device including a power receiving portion and a load portion which is electrically connected to the power receiving portion,
wherein the power receiving portion in the power receiving device comprises a power receiving coil for supplying power to the load portion and a power receiving resonance coil which is not in contact with the power transmitting coil and is electromagnetically coupled with the power receiving coil by electromagnetic induction, and
wherein the power transmitting resonance coil is resonant with the power receiving resonance coil in the power transmitting state.

19. A power feeding method using the power feeding system according to claim 18 and comprising the steps of:
a first step in which, in the power transmitting portion, the third switch is turned off and the first switch and the second switch are turned on to set the power transmitting device into the power transmitting state;

a second step in which, in the power transmitting coil, power supplied from the power source portion is transmitted to the power transmitting resonance coil;

a third step in which, in the power transmitting resonance coil, power is transmitted to the power receiving device; and a fourth step in which power reflected by the power transmitting resonance coil in the third step is inputted to the second switch and the third switch via the directional coupler, wherein when the reflected power is smaller than the reference power in the fourth step, the first switch and the second switch remain ON and the power transmitting maintains the power transmitting state and also the third step and the fourth step are repeated, and wherein when the reflected power is larger than the reference power in the fourth step, the first switch and the second switch are turned off and the power transmitting device is in the non-power transmitting state and also the third switch is turned on to transmit the reflected power to the power source portion via the third switch.

20. The power feeding method according to claim 19, wherein a resonant frequency of the power transmitting resonance coil is different between the power transmitting state and the non-power transmitting state.

* * * * *